United States Patent
Mickal et al.

Patent Number: 5,218,288
Date of Patent: Jun. 8, 1993

[54] METHOD AND APPARATUS FOR MONITORING THE OPERATIONAL STATE AND STAND-BY OF A BATTERY

[75] Inventors: Hermann Mickal; Dietmar Fischer, both of Erlangen, Fed. Rep. of Germany

[73] Assignee: Siemens Aktiengesellschaft, Berlin and Munich, Fed. Rep. of Germany

[21] Appl. No.: 647,470

[22] Filed: Jan. 29, 1991

[30] Foreign Application Priority Data

Mar. 26, 1990 [EP] European Pat. Off. ......... 90105718.2

[51] Int. Cl.$^5$ .................. H02J 7/04; G01N 27/46
[52] U.S. Cl. ........................... 320/48; 307/66; 320/13; 320/43
[58] Field of Search .............. 320/13, 43, 44, 48; 307/66

[56] References Cited

U.S. PATENT DOCUMENTS

| | | | |
|---|---|---|---|
| 4,380,726 | 4/1983 | Sado et al. | 320/13 X |
| 4,433,294 | 2/1984 | Windebank | 320/48 X |
| 4,820,966 | 4/1989 | Fridman | 320/32 |

FOREIGN PATENT DOCUMENTS

| | | |
|---|---|---|
| 0359237 | 3/1990 | European Pat. Off. |
| 2609555 | 7/1988 | France. |
| 2116728 | 9/1983 | United Kingdom. |

Primary Examiner—R. J. Hickey
Attorney, Agent, or Firm—Kenyon & Kenyon

[57] ABSTRACT

A method and apparatus for monitoring the operational state ($C_R$) and stand-by ($t_{St}$) of a battery averages battery currents ($I_B$) and battery voltages ($U_B$) and determines the operating mode (charging $L_A$, or discharging, $E_n$) from the direction of the battery current ($I_B$). When discharging ($E_n$), a discharge power ($P_{En}$) is calculated form the average battery current ($I_{Bm}$) and battery voltage ($U_{Bm}$). The average cell voltage ($U_{BZ}$) is determined by dividing the average battery voltage ($U_B$) by the number of cells ($Z_z$) in the battery. The cell discharge power ($P_{EnZ}$) is determined by dividing the discharge power ($P_{En}$) by the number of cells ($Z_z$) in the battery. Consequently, the cell discharge time ($t_p$) is known since it is proportional to the cell discharge power ($P_{EnZ}$). The cell discharge power ($P_{EnZ}$) is then compared with stored families of curves of cell voltage versus withdrawn capacity ($C_{En}$) and cell discharge power ($P_{EnZ}$). The withdrawn capacity ($C_{En}$) is determined from the average cell voltage ($U_{BZ}$) and the previously determined cell discharge power ($P_{EnZ}$). The withdrawn capacity ($C_{En}$) is subtracted from the maximum capacity ($C_{max}$) to determine the residual capacity ($C_R$), which is multiplied by the discharge time ($t_p$). Consequently with the aid of only one family of curves and without large expenses, the operational state ($C_R$) and the stand-by ($t_{St}$) of a battery can be monitored.

6 Claims, 4 Drawing Sheets

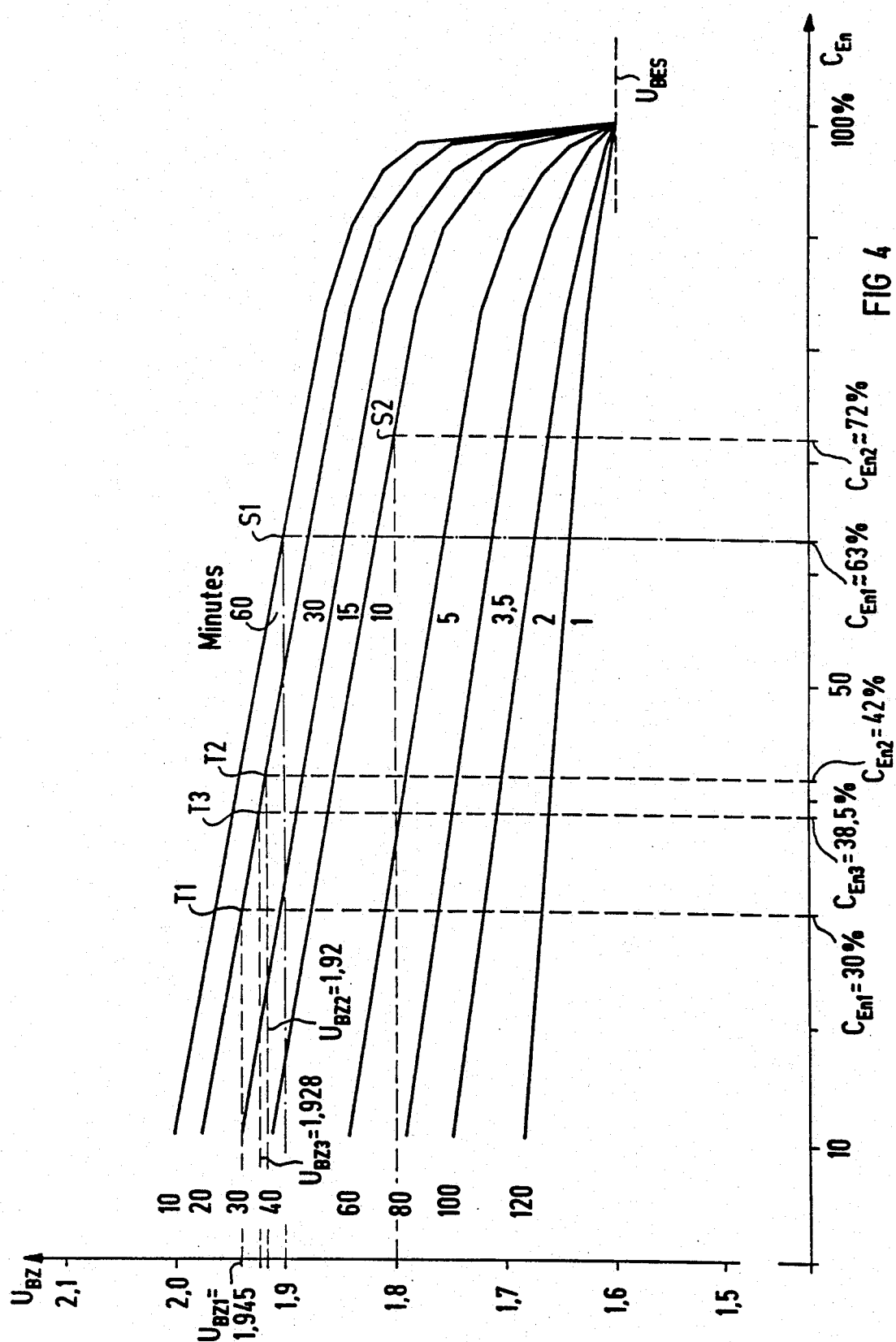

METHOD AND APPARATUS FOR MONITORING THE OPERATIONAL STATE AND STAND-BY OF A BATTERY

BACKGROUND OF THE INVENTION

The present invention relates to a method and apparatus for monitoring the operational state and stand-by of a battery, and more particularly to such a method and apparatus that averages actual values of battery current and voltage and determines the mode of operation from the direction of the battery current.

Monitoring devices are commercially available which monitor the operational state and the stand-by of a battery, in particular those that monitor the battery of an uninterruptible power system. Such a monitoring device does not directly intervene in the installation being monitored. The following curves or family of curves can be created and deposited in a memory of a monitoring device from the known discharge curves describing a battery cell with sufficient precision:

cell voltage as a function of the relative withdrawn capacity with current or discharge time as a parameter;
absolute withdrawn capacity as a function of the discharge current or the discharge time;
cut-off voltage as a function of the discharge current;
initial discharge voltage as a function of the discharge current; and
charging voltage as a function of the withdrawn capacity.

The type of battery voltage and depends on the operational state (charging or discharging) of the battery. Determining whether charging or discharging is taking place can be made by a processor of a monitoring device in conjunction with the direction of the battery current. The battery's actual values detected in the different operational states supplied to this monitoring device are compared with the stored curves or family of curves of the battery cell.

Since the evaluation of the battery's actual values requires several curves or family of curves, the monitoring device requires large storage space and the evaluation method is complex.

The present invention is directed to the problem of developing a metal and an apparatus for monitoring the operational state and readiness of a battery having a reduced required storage space and a simplified evaluation method.

SUMMARY OF THE INVENTION

The present invention solves the aforementioned problems of conventional monitors by first determining that the battery is discharging and then calculating an average cell discharge power and an average cell voltage from the average battery current and voltage and the number of cells in the battery. Then, the average cell discharge power is compared with the stored family of curves of cell voltage versus withdrawn capacity as a function of the cell discharge power to determine the withdrawn capacity. The withdrawn capacity is subtracted from the maximum capacity to determine the residual capacity, which is then multiplied by a cell discharge time. The cell discharge time is known since it is proportional to the calculated cell discharge power.

By forming the family of curves of cell voltage versus withdrawn capacity as a function of discharge power, the residual capacity of a battery can be determined from the calculated discharge power without great expense. In the family of curves, each discharge power curve is drawn for a maximum discharge time, thus knowing the discharge power, i.e., which curve applies, determines the maximum discharge time. The stand-by or the backup time can be determined from this maximum discharge time and the previously determined operational state, or the residual capacity, by a simple multiplication. The operational state and the stand-by of a battery can be determined in a simple manner by means of simple arithmetic operations because only one family of curves and the calculated discharge power is required rather than five families of curves.

In an advantageous method, the battery is changed into the discharge mode and the stand-by of a battery is determined at two different points in time. One predetermined length of time between the two points in time is given, and the two determined stand-bys are subtracted from each other and this difference is compared with the predetermined length of time. If the difference is outside of a predetermined tolerance range for the time length, the battery is determined to be damaged. In this way, the battery can be tested at any time. As a result of this test it may be determined whether or not the battery is in operating condition or damaged. Consequently, the battery can be tested at regular time intervals (multiple of operating hours) by maintenance personnel or by a maintenance program so that a damaged battery can be replaced in a timely fashion.

This method according to the present invention can be applied advantageously in an uninterruptible power system which integrates the apparatus for carrying out the method into a control and regulation device. But the apparatus can also be accommodated on a control panel of an uninterruptible power system.

BRIEF DESCRIPTION OF THE DRAWINGS

FIGS. 3 and 4 show families of curves depicting cell voltage versus withdrawn capacity as a function of cell discharge power.

DETAILED DESCRIPTION

Figure 1:
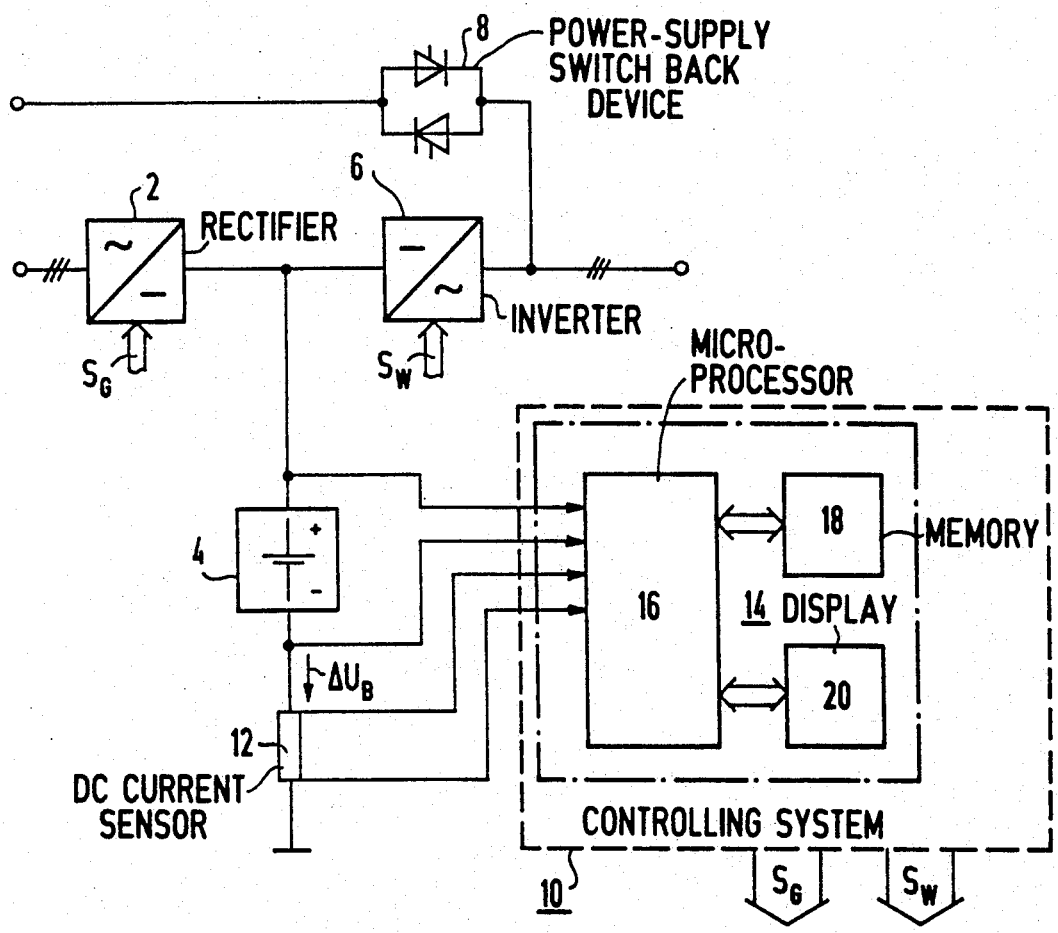
FIG. 1 shows a block diagram of an uninterruptible power system having an embodiment of the apparatus implementing the method of the present invention.

FIG. 1 shows a block diagram of an uninterruptible power system (UPS). This uninterruptible power system comprises a rectifier 2, a battery 4, an invertor 6, a power supply switch-back device 8, and a controlling system 10. In the branch of the block diagram including the battery, there is a dc current measuring sensor 12 which determines a battery current $I_B$.

Figure 3:
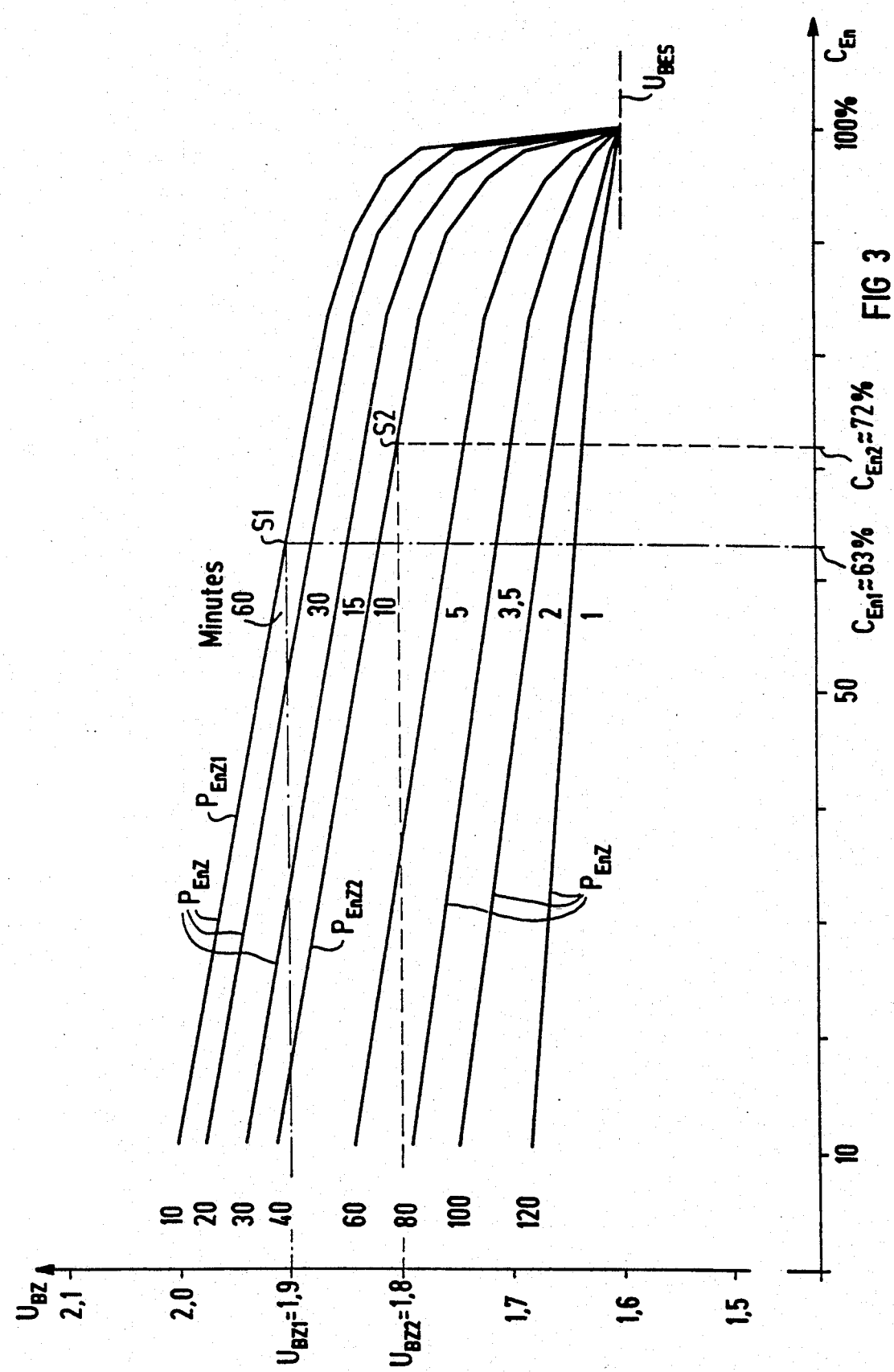

The controlling system 10 of the uninterruptible power system has a current 14 that impelements a method for monitoring the operational state and the stand by state of the battery 4. This circuit 14 comprises a microprocessor 16, a memory 18, and a display 20. The families of curves depicting the cell voltage versus withdrawn capacity as a function of cell discharge power are placed in the memory. FIGS. 3 and 4 illustrate examples of the stored families of curves. The display 20 displays the operational state (residual capacity $C_4$) and/or the stand-by state (back-up time ($t_{St}$) of the battery 4.

The microprocessor 16 determines the residual capacity $C_R$ and the stand-by $t_{St}$ of the battery 4 from the actual values of battery current $I_B$ and battery voltage $U_B$. The dc current measuring sensor 12 determines the actual battery current $I_B$. The microprocessor 16 decides whether charging $L_A$ or discharging $E_n$ is occurring by checking the sign of the voltage drop $U_B$. The sign indicates the direction of current or the operating mode (charging or discharging). At the beginning of discharging $E_n$ a battery current $I_B$ of at least 3% of the nominal current $I_{BN}$ must flow for at least one second in the battery circuit. To ensure that the calculations are accurate, calculations during the initial voltage drop are avoided. Moreover, a temporary load decrease to zero in the discharging operation $E_n$ cannot lead to a faulty evaluation.

Families of curves of eight battery plates are stored in the memory. By selecting the plate number from 1 to 16 and a nominal discharge current, practically all cells produced from this plate construction type can be covered. Depending on their electro-chemical makeup, batteries may have different cell voltages. For example, the nominal voltage of a nickel/cadmium cell is 1.2 V, whereas a lead acid cell is 2.0 V. This nominal voltage deviates only slightly from the no-load voltage.

Figure 2:
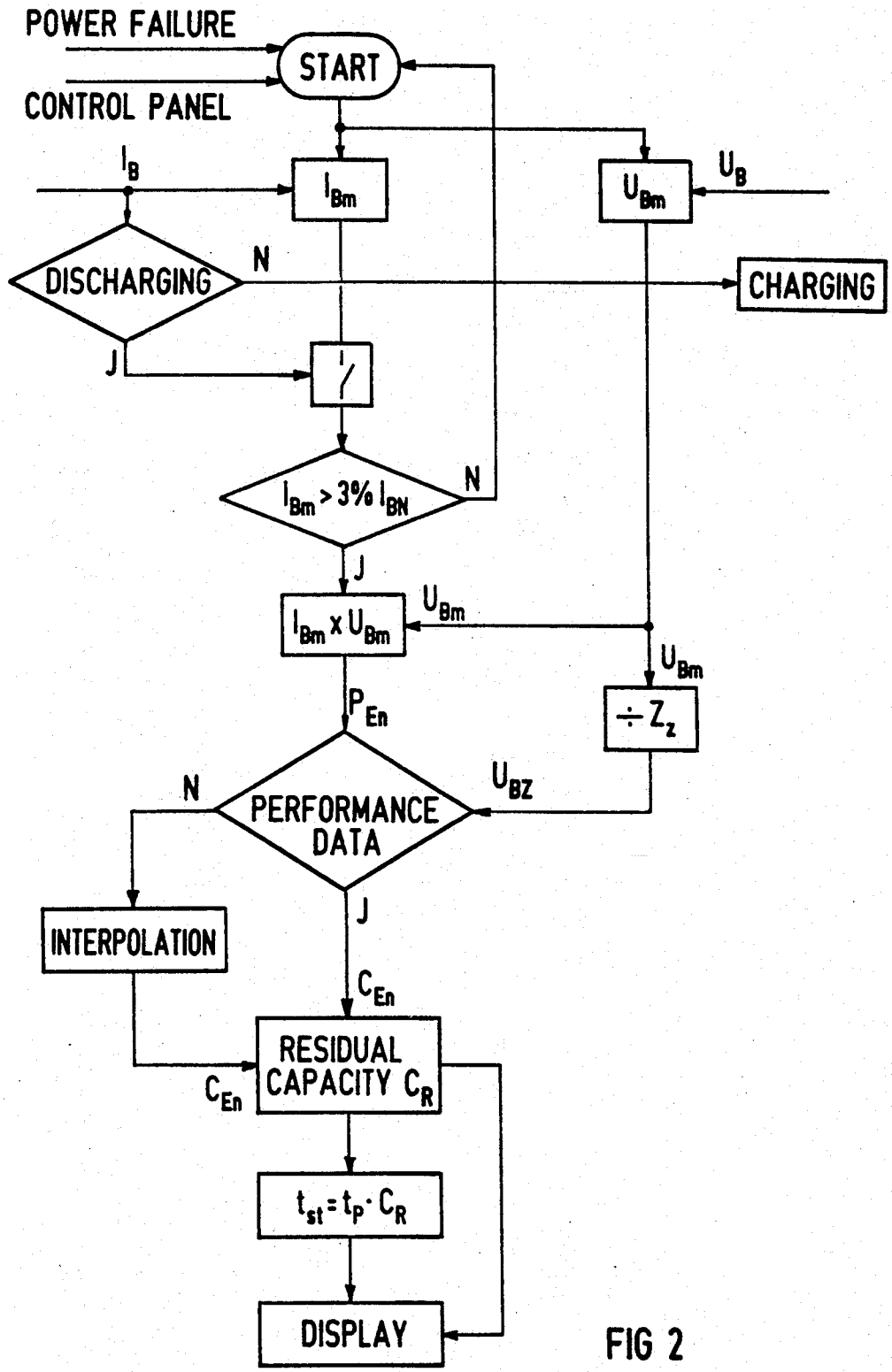
FIG. 2 is a flow chart of the method of the present invention.

Using FIG. 2, the method of the present invention will be explained below in greater detail. The process starts from the control panel of the uninterruptible power system from either power failure or manual initiation. First, the mean values of battery current $I_B$ and battery voltage $U_B$ are calculated. Battery charging $L_A$ or discharging $E_n$ is determined from the direction of the battery current $I_B$. If the battery is discharging $E_n$, then the process continues and determines whether the average battery current $I_{Bm}$ is greater than 3% of the nominal battery current $I_{BN}$. If so, then the average battery current $I_{Bm}$ and voltage $U_{Bm}$ are multiplied by each other to determine the discharge power $P_{En}$. Dividing this discharge power $P_{En}$ by the number of cells in the battery determines the cell discharge power $P_{EnZ}$. Using the family of curves of cell voltage versus withdrawn capacity as a function of cell discharge power, the cell discharge power $P_{EnZ}$ and the average cell voltage $U_{BZ}$, the capacity $C_{En}$ already withdrawn from the battery 4 can be determined. The average cell voltage $U_{BZ}$ is obtained by dividing the average battery voltage $U_{Bm}$ by the number of cells $Z_Z$ in the battery 4. If a discharge power capacity $P_{EnZ}$ does not fall on one of the curves of cell voltage versus withdrawn capacity as a function of discharge power, then the capacity $C_{En}$ already withdrawn from the battery is obtained by interpolation. The operational state or the residual capacity $C_R$ of battery 4 is obtained by subtracting the capacity $C_{En}$ already withdrawn from the battery 4 from the maximum capacity $C_{max}$ of the battery 4. This residual capacity $C_R$ can be displayed by the display 20. Since this value alone is not sufficiently meaningful, the stand-by or the back-up time $t_{St}$ of battery 4 is also calculated. To this end, a discharge time $t_P$ (i.e., the time needed to discharge the battery at the discharge power $P_{En}$) is read from the memory 18 since it is proportional to the cell discharge power. This discharge time $t_P$ is multiplied by the residual capacity $C_R$ to obtain the back-up time $t_{St}$. This value also can be displayed with the residual capacity $C_R$ or by itself.

Referring to the family of curves of cell voltage versus withdrawn capacity as a function of cell discharge power, represented in FIG. 3 and by using a numerical example, the simplicity of determining the operational state $C_R$ and the stand-by $t_{ST}$ of battery 4 will be shown. Battery 4 comprises 192 cells, and has a nominal battery voltage $U_{BN}$ of 384 V. In this battery 4, the cut-off voltage $U_{BES}$ is 307 V. since we must account for the voltage drop of the battery feed, which could be 8 V at nominal current, the battery cut-off voltage is $U_{BES} = 315$ V or the cell cut-off voltage is $U_{BZ} = 1.64$ V. The battery current $I_B$ and the battery voltage $U_B$ are supplied to the microprocessor 16, which are now averaged to give the following values:

$I_{Bm1} = 5.3$ A, $U_{Bm1} = 365$ V, $U_{BZ1} = 1.9$ V
$I_{Bm2} = 22.2$ A, $U_{Bm2} = 346$ V, $U_{BZ2} = 1.8$ V.

The indices 1 and 2 indicate that two different loads for battery 4 are assumed for this numerical example. From these values, the microprocessor 16 calculates the discharge power $P_{En1} = 1.935$ kW or $P_{En2} = 7.681$ kW, and the discharge power per cell $P_{EnZ1} = 10.07$ W or $P_{EnZ2} = 40$ W, respectively. The discharge power per cell specifies a particular curve from the stored family of curves. A horizontal line is drawn from the cell voltage $U_{BZ1} = 1.9$ V or $U_{BZ2} = 1.8$ V to the particular discharge power curve in the family of curves 10 W/60 min or 40 W/10 min, respectively. A vertical line is drawn from the intersection S1 or S2 to the horizontal axis. The intersection with the horizontal axis indicates how much of the maximum capacity $C_{max} = 1$ or $C_{max} = 100\%$ has already been withdrawn ($C_{En}$). In case 1, the withdrawn capacity $C_{En1} = 63\%$ and in case 2, the withdrawn capacity $C_{En2} = 72\%$. The residual capacity is:

$$C_{R1} = C_{max} - C_{En1} = 1 - 0.63 = 0.37 = 37\%$$

or $$C_{R2} = C_{max} - C_{En2} = 1 - 0.72 - 0.28 = 38\%.$$

This residual capacity $C_{R1}$ $C_{R2}$ is available for a back-up time $t_{St1}$ or $T_{St2}$, respectively. Since by knowing time $t_{P1}$ or $t_{P2}$ is also known, it is also possible to calculate the associated back-up time $t_{St1}$ by using the residual capacity $C_{rl}$ or $C_{R2}$. The back-up time $t_{St1}$ or $t_{St2}$ equals:

$$t_{St1} = t_{P1} \times C_{41} = 60 \text{ min.} \times 0.37 = 22.2 \text{ min}$$

or $$t_{St2} = t_{P2} \times C_R \times 10 \text{ min} \times 0.28 = 2.8 \text{ min.}$$

The values of the residual capacity $C_{R1}$ or $C_{R2}$ or the back-up time $t_{St1}$ or $t_{St2}$ can be represented individually or together by the display 20.

Referring to the family of curves shown in FIG. 4 and by using a numerical example, the battery test is explained in greater detail. The battery begins discharging. At a point in time T1, the following average values of battery current $I_{Bm}$ and battery voltage $U_{Bm}$ are available:

$I_{Bm1} = 10.28$ A, $U_{Bm1} = 373.5$ V, $U_{BZ1} 1.945$ V.

Using these values, the following discharge power is obtained:

$P_{En1} = 3.849$ kW, $P_{EnZ1} = 20$ W.

Referring to the cell discharge power curve $P_{EnZ1} = 20$ W/30 min., the following residual capacity $C_{R1}$ and the following back-up time $t_{St1}$ are obtained:

$C_{En1} = 30\%$, $C_{R1} = 70\%$, $t_{St1} = 21$ min.

After a period of time $t_A = 2.5$ min at time T2, the actual values of battery current $I_B$ and battery voltage $U_B$ are measured and averaged again:

$I_{Bm2} = 10.42$ A, $U_{Bm2} = 368.5$ V, $U_{BZ2} = 1.92$ V.

Using these values, the following discharge power is obtained:

$P_{En2} = 3.84$ kW, $P_{EnZ2} = 20$ W.

Referring to the cell discharge power curve $P_{EnZ2} = 20$ W/30 min., the following residual capacity $C_{R2}$ and the following back-up time $t_{St2}$ is obtained:

$C_{En2} = 42\%$, $C_{R2} = 58\%$, $t_{St2} = 17.4$ min.

If the back-up times $t_{St1}$ and $t_{St2}$ are subtracted one from the other, a difference $t_{diff} = 3.6$ min is obtained. A comparison with the predetermined time length $t_A = 2.5$ min shows that the difference value $t_{diff} = 3.6$ min is considerably greater.

Even if a tolerance band of $+10\%$ is permitted the determined difference value $t_{diff} = 3.6$ min is outside the tolerance band. This means that the battery 4 is already damaged.

For a battery 4 which is in good operating condition, after a length of time $t_A = 2.5$ min starting from time T1 values similar to the following values must occur (at point of time T3):

$I_{Bm3} = 10.37$ A, $U_{Bm3} 370.2$ V, $U_{BZ3} = 1.928$ V $P_{En3} = 3.84$ kW, $P_{EnZ3} = 20$ W $C_{En3} = 38.5\%$, $C_{R3} = 61.5\%$, $t_{St3} = 18.45$ min $$t_{diff} = t_{St1} - t_{St3} = 21 \text{ min} - 18.45 \text{ min} = 2.55 \text{ min}.$$

The difference value $t_{diff} = 2.55$ min is within the tolerance band of $+10\%$ relative to the predetermined length of time $t_A = 2.5$ min.

consequently by the method according to the present invention, a battery 4 of an uninterruptible power system can be tested in simple manner at any time, allowing for timely replacement of a damaged battery.

What is claimed is:

1. A method for monitoring an operational state ($C_R$) and a stand-by ($t_{St}$) of a battery comprising the steps of:
   a) sensing a plurality of actual values of battery current ($I_B$);
   b) sensing a plurality of actual values of battery voltage ($U_B$);
   c) averaging the plurality of actual values of battery current ($I_B$) to determine an average battery current ($I_{Bm}$);
   d) averaging the plurality of actual values of battery voltage ($U_B$) to determine an average battery voltage ($U_{Bm}$);
   e) determining whether the battery is in a charge or a discharge mode ($L_A$, $E_n$) from a direction of the battery current ($I_B$);
   f) calculating a discharge power ($P_{En}$), if the battery is in a discharge mode ($E_n$), from the average battery current ($I_{Bm}$) and the average battery voltage ($U_{Bm}$);
   g) calculating an average cell voltage ($U_{BZ}$) from the average battery voltage ($U_{Bm}$) and the number of cells ($Z_Z$) in the battery;
   h) calculating a cell discharge power ($P_{EnZ}$) by dividing the discharge power ($P_{En}$) by the number of cells ($Z_Z$) in the battery;
   i) comparing the cell discharge power ($P_{EnZ}$) and the average cell voltage ($U_{BZ}$) with a plurality of families of curves of the average cell voltage ($U_{BZ}$) versus a withdrawn capacity ($C_{En}$) as a function of the cell discharge power ($P_{EnZ}$), to determine the withdrawn capacity ($C_{En}$);
   j) subtracting the withdrawn capacity ($C_{En}$) from a maximum capacity ($C_{max}$) to determine the residual capacity ($C_R$); and
   k) multiplying the residual capacity ($C_R$) by a discharge time ($t_P$), which is proportional to the calculated discharge power ($P_{EnZ}$), to get the stand-by ($t_{St}$) of the battery.

2. A method for monitoring an operational state ($C_R$) and a stand-by ($t_{St}$) of a battery, and for determining whether the battery is damaged, comprising the steps of:
   a) bringing the battery into a discharge mode at a first time (T1);
   b) sensing a plurality of actual values of battery current ($I_B$);
   c) sensing a plurality of actual values of battery voltage ($U_B$);
   d) averaging the plurality of actual values of battery current ($I_B$) to determine an average battery current ($I_{Bm}$);
   e) averaging the plurality of actual values of battery voltage ($U_B$) to determine an average battery voltage ($U_{Bm}$);
   f) calculating a discharge power ($P_{En}$) from the average battery current ($I_{Bm}$) and the average battery voltage ($U_{Bm}$);
   g) calculating an average cell voltage ($U_{BZ}$) from the average battery voltage ($U_{Bm}$) and a number of cells ($Z_Z$) in the battery;
   h) calculating a cell discharge power ($P_{EnZ}$) by dividing the discharge power ($P_{En}$) by the number of cells ($Z_Z$) in the battery;
   i) comparing the cell discharge power ($P_{EnZ}$) and the average cell voltage ($U_{BZ}$) with a plurality of families of curves of the average cell voltage ($U_{BZ}$) versus a withdrawn capacity ($C_{En}$) as a function of the cell discharge power ($P_{EnZ}$), to determine the withdrawn capacity ($C_{En}$);
   j) subtracting the withdrawn capacity ($C_{En}$) from a maximum capacity ($C_{max}$) to determine the residual capacity ($C_R$);
   k) multiplying said residual capacity ($C_R$) by a discharge time ($t_P$), which is proportional to the discharge power ($P_{EnZ}$), to get a first stand-by ($t_{St1}$) of the battery;
   l) bringing the battery into the discharge mode at a second time (T2) and repeating steps b) through j) to determine the residual capacity ($C_R$) at the second time (T2) wherein the second time (T2) is separated in time from said first time (T1) by a predetermined length of time ($t_A$);
   m) multiplying said residual capacity ($C_R$) at the second time by the discharge time ($t_P$) to get a second stand-by ($t_{St2}$) of the battery;
   n) subtracting the second stand-by ($t_{St2}$) from the first stand-by ($t_{St1}$) to obtain a difference value ($t_{diff}$); and
   o) comparing the difference value ($t_{diff}$) with said predetermined length of time ($t_A$), whereby if the difference value ($t_{diff}$) is outside of a predetermined tolerance band of the length of time ($t_A$), the battery is detected to be damaged.

3. An uninterruptible power system comprising:
   a) a battery having an input and an output;

b) a rectifier having an output coupled to the output of the battery and converting ac voltage to dc voltage;
c) an inverter having an input coupled to the output of the battery, having an output, and converting dc voltage to ac voltage;
d) a power supply switch-back device having an input coupled to the output of the inverter; and
e) a controlling system coupled to the input and the output of the battery;
f) a circuit monitoring an operational state ($C_R$) and a stand-by ($t_{St}$) of the battery integrated into said controlling system.

4. An apparatus for monitoring an operation state ($C_R$) and a stand-by ($t_{St}$) of a battery comprising:
a) means for sensing voltage from said battery;
b) means for sensing current from said battery;
c) a microprocessor, said microprocessor being electrically connected to said means for sensing voltage from said battery and said means for sensing current from said battery;
d) a memory providing input to said microprocessor;
said microprocessor receiving a plurality of battery voltages and a plurality of battery currents, and calculating the operational state ($C_R$) and the stand-by ($t_{St}$) from the plurality of battery voltages and currents and the input from the memory; and
e) a display displaying the operational state ($C_R$) and the stand-by ($t_{St}$) of the battery,
wherein said memory contains a family of curves of a cell voltage ($U_{BZ}$) versus a withdrawn capacity ($C_{En}$) at a constant discharge power to be output from said memory and input to said microprocessor.

5. An apparatus for monitoring an operation state ($C_R$) and a stand-by ($t_{St}$) of a battery comprising:
a) means for sensing voltage from said battery;
b) means for sensing current from said battery;
c) a microprocessor, said microprocessor being electrically connected to said means for sensing voltage from said battery and said means for sensing current from said battery;
d) a memory providing input to said microprocessor;
said microprocessor receiving a plurality of battery voltages and a plurality of battery currents, and calculating the operational state ($C_R$) and the stand-by ($t_{St}$) from the plurality of battery voltages and currents and the input from the memory; and
e) a display displaying the operational state ($C_R$) and the stand-by ($t_{St}$) of the battery,
wherein said memory contains a family of curves relating a cell voltage ($U_{BZ}$) to a withdrawn capacity ($C_{En}$) and time to be output from said memory and input to said microprocessor.

6. An apparatus for monitoring an operational state ($C_R$) and a stand-by ($t_{St}$) of a battery comprising:
a) means for sensing voltage from said battery;
b) means for sensing current from said battery;
c) a microprocessor, said microprocessor being electrically connected to said means for sensing voltage form said battery and said means for sensing current from said battery;
d) a memory providing input to said microprocessor;
said microprocessor receiving a plurality of battery voltages and a plurality of battery currents, and calculating the operational state ($C_R$) and the stand-by ($t_{St}$) from the plurality of battery voltages and currents and the input from the memory; and
c) a display displaying the operational state ($C_R$) and the stand-by ($t_{St}$) of the battery,
wherein said memory contains a family of curves of a cell voltage ($U_{BZ}$) versus a withdrawn capacity ($C_{En}$) at a constant discharge power and time to be output from said memory and input to said microprocessor.

* * * * *